Figure 1:
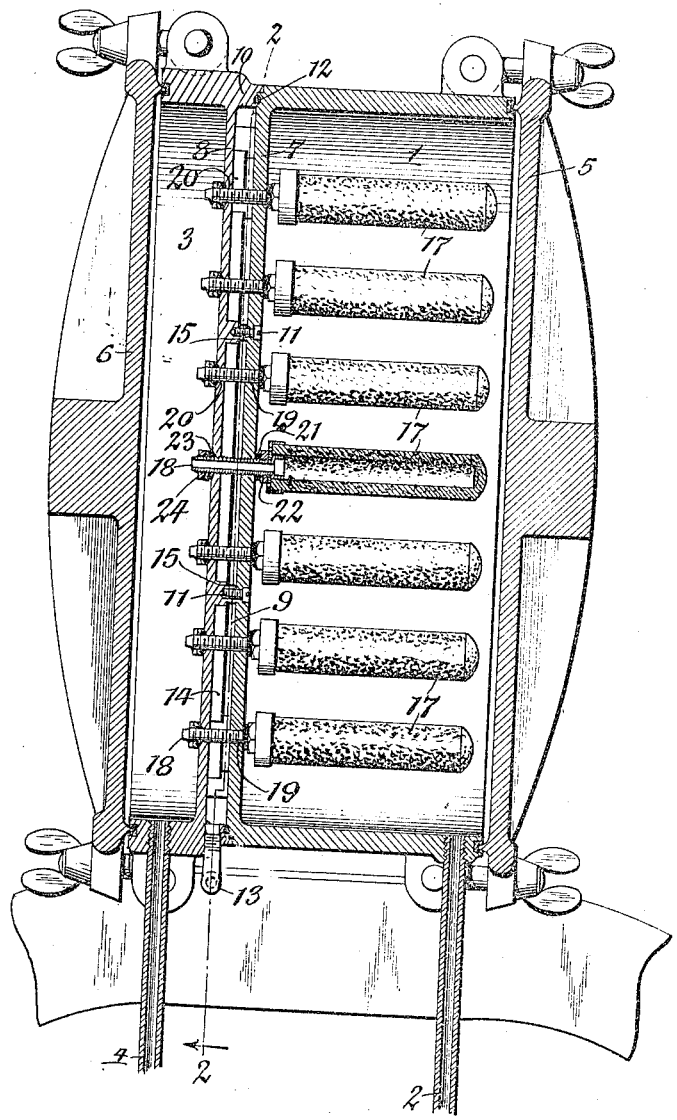

E. ZAHM.
FILTER.
APPLICATION FILED MAR. 31, 1913. RENEWED APR. 13, 1916.

1,203,835.

Patented Nov. 7, 1916
2 SHEETS—SHEET 1.

WITNESSES
Walter P. Geyer.
W. Ray Taylor.

INVENTOR
Edward Zahm
by Geyer & Popple
ATTORNEYS

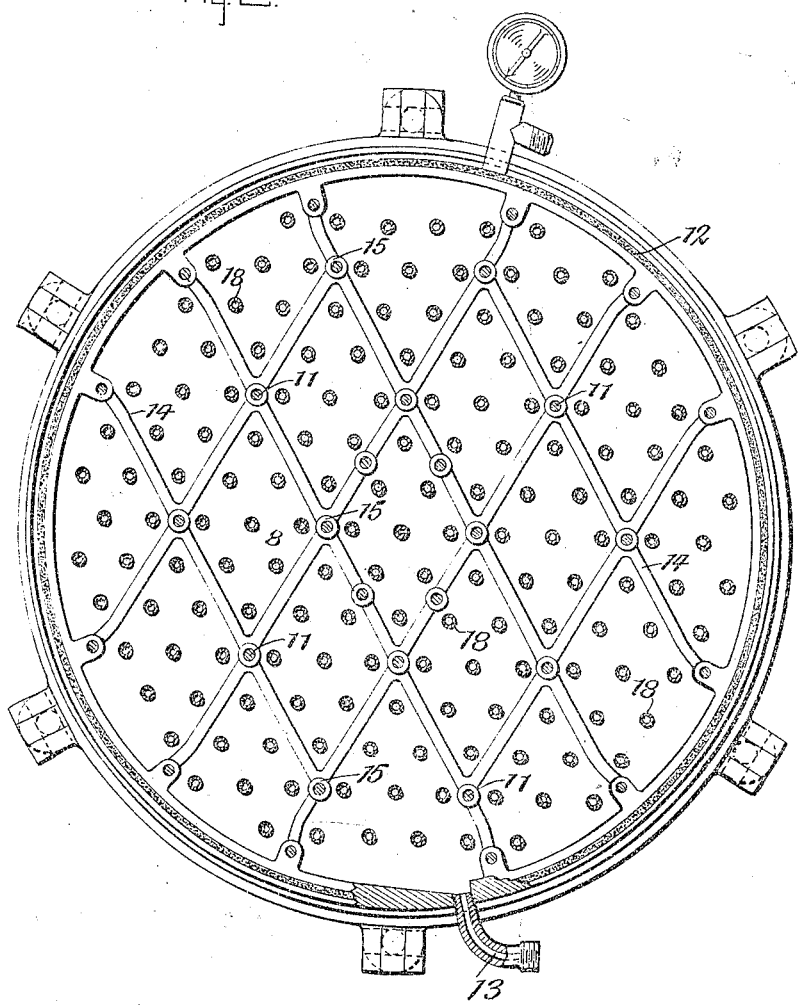

UNITED STATES PATENT OFFICE.

EDWARD ZAHM, OF BUFFALO, NEW YORK, ASSIGNOR TO ZAHM MANUFACTURING COMPANY, OF BUFFALO, NEW YORK, A CORPORATION OF NEW YORK.

FILTER.

1,203,835. Specification of Letters Patent. Patented Nov. 7, 1916.

Application filed March 31, 1913, Serial No. 757,783. Renewed April 13, 1916. Serial No. 90,980.

*To all whom it may concern:*

Be it known that I, EDWARD ZAHM, a citizen of the United States, residing at Buffalo, in the county of Erie and State of New York, have invented new and useful Improvements in Filters, of which the following is a specification.

This invention relates to that class of filters which comprise an inlet chamber adapted to receive the body of liquid to be filtered, an outlet chamber adapted to receive the body of filtered liquid and a plurality of porous filtering tubes which are arranged in the inlet chamber and provided with tubular necks leading into the outlet chamber and supported by a partition between these chambers. In filters of this character as heretofore constructed the inlet and outlet chambers were separated by a single partition or wall which was provided with a set of openings in which the outlet necks of the filter tubes were secured. If the joint between these filter tube necks and the partition between the inlet and outlet chambers was imperfect it would be possible for unfiltered liquid to leak between said necks and the partition into the outlet chamber, thereby contaminating the filtered liquid and defeating the purpose of filtration.

It is the object of this invention to produce a filter in which the filter tubes are so mounted on the partition between the inlet and outlet chambers that leakage between the filter tubes and the partition upon which they are supported will be prevented from contaminating the filtered liquid by unfiltered liquid, and this leakage will be immediately visible on the exterior of the filter so that tightening, repairing or adjusting of the filter for stopping this leakage may be effected before the leakage has resulted in any considerable waste.

In the accompanying drawings: Figure 1 is a vertical longitudinal section of a filter embodying my improvements. Fig. 2 is a vertical transverse section, taken in line 2—2, Fig. 1.

Similar characters of reference indicate corresponding parts in both views.

1 represents the inlet chamber which receives the supply of liquid to be filtered through a pipe 2 and 3 the outlet chamber which receives the filtered liquid and delivers the same through a pipe 4. At its outer end the inlet chamber is provided with a removable cover 5 and at the outer end of the outlet chamber the same is also provided with a removable cover 6, whereby access is afforded to the interior of these chambers for cleaning, inspection, adjustment and repairs of the interior of these chambers and the parts inclosed thereby.

The inner walls 7, 8 of the inlet and outlet chambers, respectively, are arranged opposite each other and practically form a partition between these two chambers. The inlet and outlet chambers are rigidly secured together so as to form an intervening space or leak chamber 9 between the inner walls thereof by means of a marginal flange or rim 10 formed on one of these chambers, preferably the outlet chamber, and engaging with the marginal part of the inlet chamber, and a plurality of coupling or fastening screws 11 connecting the inner heads of these chambers at suitable points over the area thereof. The joint between the marginal flange 10 and the inlet chamber is preferably made liquid tight by means of a packing 12 of any suitable character arranged between these parts. In the lowermost part of the leak chamber the same is provided with an outlet opening communicating with a drain pipe or nozzle 13 which leads to the exterior of the filter or to the atmosphere so that any liquid which enters this leak chamber may be conducted to the external atmosphere or the space outside of the filter proper. In order to stiffen or strengthen the inner walls of the outlet and inlet chambers the outer side of one of these walls, preferably the inner wall of the outlet chamber, is provided with a plurality of stiffening or strengthening ribs 14 which are arranged in the form of lattice work, as shown in Fig. 2, which ribs are provided at suitable places with spacing bosses 15 of greater height or thickness than the ribs and bear against the outer side of the inner head of the inlet chamber and are secured to the last mentioned head by means of screws 11 introduced through the inlet chamber, as shown in Fig. 1. By this means the various parts of the space or leak chamber between the inlet and outlet chambers are in free communication with each other so as to practically form an unbroken space or chamber but the inner walls of the inlet and outlet chambers are securely fastened together at intervals so as to prevent displacement thereof under pressure.

Within the inlet chamber are arranged a plurality of filter tubes or cylinders 17 which are constructed of suitable porous filtering material. Each of these filter tubes is provided at its rear or inner end with a hollow neck 18 having an external screw thread.

19 represents a plurality of openings formed in the inner wall of the inlet chamber and 20 a plurality of openings formed in the inner wall of the outlet chamber, each opening in the outlet chamber being in line with a corresponding opening in the inner wall of the inlet chamber and forming a pair therewith. Each of the filter tubes has its neck extending from the inlet chamber into the outlet chamber and through a corresponding pair of openings 19, 20 in the inner walls of these chambers. This neck is secured in these openings so as to form a tight joint between the same and the respective inner walls of the inlet and outlet chambers by means which preferably comprise a packing ring 21 surrounding the neck and interposed between a shoulder 22 on the same and the inner side of the inner wall of the inlet chamber, and a packing ring 23 surrounding the neck and engaging on one side with a pair of screw nuts 24 on the other end of the neck while its opposite side engages with the inner side of the inner wall of the outlet chamber. Upon tightening the screw nuts 24 a liquid tight joint is produced between the neck of the filter tube and the inner walls of the inlet and outlet chambers.

During the normal operation of the filter the liquid supplied under pressure by the pipe 2 to the inlet chamber passes from the latter through the pores of the filter tubes into the interior thereof whereby the solid impurities are separated from the liquid and remain on the outer sides of the filter tubes while the clarified liquid passes from the interior of the filter tubes through the necks thereof into the outlet chamber and is delivered from the latter through the pipe 4. If the joint between the neck of any one of the filter tubes and the inner wall of the inlet chamber is imperfect and permits the passage of any liquid, the liquid leaking through this joint will enter the leak chamber between the inlet and outlet chambers and pass downwardly through the drain pipe or nozzle at the lower end of this chamber to the exterior of the filter or the external atmosphere where the same is detected by the attendant and thus serves as a signal or indicator that the filter is leaking and requires correction. Inasmuch, therefore, as any leakage of liquid from the inlet chamber through the joint between the inner wall thereof and the neck of a filter tube is conducted to the exterior of the filter such unfiltered liquid is prevented from reaching the body of filtered liquid in the outlet chamber and contamination of the filtered product is therefore positively avoided.

In the event of any liquid leaking from the outlet chamber through the joint between the neck of one of the filter tubes and the inner wall of the outlet chamber such leakage will be received by the leak chamber and conducted from the latter through the drain pipe or nozzle to the exterior of the filter, thereby also serving as a warning to the attendant that the filter is not in order and requires attention in this respect. It will thus be noted that leakage either from the outlet chamber or from the inlet chamber past the neck of one or more of its filter tubes will immediately result in a showing of such liquid at the outlet of the leak chamber whereby notice is given to the attendant to correct the defect, but such leakage, be it from the outlet chamber or from the inlet chamber can at no time produce an infection of the filtered liquid by the addition thereto of any unfiltered liquid so that a perfect safe guard is by this means provided against contamination of the filtered liquid by a leak which is invisible and which cannot be ordinarily detected while the filter is in operation.

I claim as my invention:

1. A filter comprising an inlet chamber, an outlet chamber, said chambers having walls provided with openings and separated by a space which is independent of the interior of said chambers, and a filter tube arranged in one of said chambers and secured in said openings and the joints between said filter tube and said walls extending into the space between said walls.

2. A filter comprising an inlet chamber having an inner wall, an outlet chamber having an inner wall, said inner walls being provided with openings and the space between said inner walls communicating only with the space exterior of said chambers, a filter tube arranged in said inlet chamber and having a threaded neck extending through corresponding openings in said inner walls and having a shoulder engaging the inner side of the inner wall of said inlet chamber and the joints between said filter tube neck and said inner walls extending into the space between said inner walls, and a clamping nut arranged on said neck and engaging with the inner side of the inner walls of said outlet chamber.

3. A filter comprising an inlet chamber having an inner wall, an outlet chamber having an inner wall, said inner walls being provided with openings, a leak chamber arranged between said inner walls and non-communicating with the exterior of said chambers, and a filter tube arranged in the inlet chamber and having a neck secured in corresponding openings of said inner walls, the joints between said neck and inner walls extending into said leak chamber.

4. A filter comprising an inlet chamber having an inner wall, an outlet chamber having an inner wall, said inner walls being provided with openings, a marginal flange arranged on one of said chambers and engaging with the other of said chambers and forming between them a leak chamber which communicates only with the exterior of said inlet and outlet chambers, and a filter tube arranged in said inlet chamber and having a neck secured in corresponding openings in said inner walls, the joints between said neck and inner walls extending into said leak chamber.

5. A filter comprising an inlet chamber having an inner wall, an outlet chamber having an inner wall, said inner walls being provided with openings, a marginal flange arranged on one of said chambers and engaging with the other of said chambers and forming between them a leak chamber which communicates with the exterior of the filter, stiffening ribs arranged on the outer side of one of said inner walls and provided with spacing bosses engaging with the outer side of the other inner wall, and a filter tube arranged in said inlet chamber and having a neck secured in corresponding openings in said inner walls.

6. A filter comprising an inlet chamber having an inner wall, an outlet chamber having an inner wall, said inner walls being provided with openings, a marginal flange arranged on one of said chambers and engaging with the other of said chambers and forming between them a leak chamber which communicates with the exterior of the filter, stiffening ribs arranged on the outer side of one of said inner walls and provided with spacing bosses engaging with the outer side of the other inner wall, screws connecting said inner walls in line with said bosses, and a filter tube arranged in said inlet chamber and having a neck secured in corresponding openings in said inner walls.

Witness my hand this 29th day of March, 1913.

EDWARD ZAHM.

Witnesses:
 THEO. L. POPP,
 E. M. GRAHAM.